United States Patent
Teranishi

(10) Patent No.: US 9,467,234 B2
(45) Date of Patent: Oct. 11, 2016

(54) OPTICAL RECEIVER, OPTICAL RECEPTION MODULE AND METHOD FOR CONTROLLING AN OPTICAL RECEIVER

(71) Applicant: Sumitomo Electric Device Innovations, Inc., Yokohama-shi (JP)

(72) Inventor: Ryota Teranishi, Yokohama (JP)

(73) Assignee: Sumitomo Electric Device Innovations, Inc., Yokohama-shi (JP)

( * ) Notice: Subject to any disclaimer, the term of this patent is extended or adjusted under 35 U.S.C. 154(b) by 122 days.

(21) Appl. No.: 14/555,252

(22) Filed: Nov. 26, 2014

(65) Prior Publication Data

US 2015/0155950 A1   Jun. 4, 2015

(30) Foreign Application Priority Data

Nov. 29, 2013   (JP) .................................. 2013-247894

(51) Int. Cl.
*H04B 10/67* (2013.01)

(52) U.S. Cl.
CPC .................................. *H04B 10/673* (2013.01)

(58) Field of Classification Search
CPC ........... H04B 10/672–10/674; H04B 10/0797; H04B 10/67–10/677
See application file for complete search history.

(56) References Cited

U.S. PATENT DOCUMENTS

| 2011/0243576 A1* | 10/2011 | Oomori | H04B 10/07955 398/208 |
| 2012/0121259 A1* | 5/2012 | Kuwata | H04B 10/673 398/38 |
| 2014/0064724 A1* | 3/2014 | Naito | H04B 10/07955 398/25 |

FOREIGN PATENT DOCUMENTS

JP   01-115188   5/1989

* cited by examiner

*Primary Examiner* — David Payne
*Assistant Examiner* — Casey Kretzer
(74) *Attorney, Agent, or Firm* — Venable LLP; Michael A. Sartori; Laura G. Remus

(57) ABSTRACT

An optical receiver includes a semiconductor optical amplifier configured to amplify wavelength multiplexed light, an optical demultiplexer configured to demultiplex the wavelength multiplexed light amplified by the semiconductor optical amplifier into light of a plurality of signals having different wavelengths, a plurality of light-receiving elements configured to receive the signal light obtained by demultiplexing of the optical demultiplexer, a detector configured to detect an intensity of the wavelength multiplexed light of a previous stage of the optical demultiplexer, a memory configured to store an upper limit value of a drive current of the semiconductor optical amplifier corresponding to a detection result of the detector, and a controlling the drive current of the semiconductor optical amplifier by referring an output of the detector and the upper limit value.

6 Claims, 9 Drawing Sheets

OPTICAL RECEIVER, OPTICAL RECEPTION MODULE AND METHOD FOR CONTROLLING AN OPTICAL RECEIVER

BACKGROUND OF THE INVENTION

1. Technical Field

The present invention relates to an optical receiver, an optical reception module and a control method of the optical receiver.

2. Background

Technology for connecting a semiconductor optical amplifier to a previous stage of art optical receiver when received, light intensity is degraded by transmission loss is known in transmission devices. In this semiconductor optical amplifier, input light is amplified and the amplified input light is output as output light (for example, see Japanese Unexamined Patent Application Publication No. H1-115188).

SUMMARY

Technology for improving transmission capacity by dividing a signal into a plurality of different wavelengths and performing multiplexed transmission is known. In an optical receiver, a demultiplexer demultiplexes transmitted wavelength multiplexed light into signal light with different wavelengths. Each light-receiving element photoelectrically converts the obtained signal light.

One aspect of the present application relates to (1) an optical receiver including: a semiconductor optical amplifier configured to amplify wavelength, multiplexed light; an optical demultiplexer configured to demultiplex the wavelength multiplexed light amplified by the semiconductor optical amplifier into light of a plurality of signals having different wavelengths; a plurality of light-receiving elements configured to receive the signal light obtained by demultiplexing of the optical demultiplexer; a detector configured to detect an intensity of the wavelength multiplexed light of a previous stage of the optical demultiplexer; a memory configured to store an upper limit value of a drive current of the semiconductor optical amplifier corresponding to a detection result of the detector; and a controlling the drive current of the semiconductor optical amplifier by referring an output of the detector and the upper limit value.

One aspect of the present application relates to (2) an optical reception module including: a semiconductor optical amplifier configured to amplify wavelength multiplexed light; an optical demultiplexer configured to demultiplex the wavelength multiplexed light amplified by the semiconductor optical amplifier into light of a plurality of signals having different wavelengths; a light-receiving element configured to receive the light of each of the signals obtained from the optical demultiplexer; and a detector configured to detect an intensity of the wavelength multiplexed light of a previous stage of the optical demultiplexer.

BRIEF DESCRIPTION OF THE DRAWINGS

The foregoing and other purposes, aspects and advantages will be better understood from the following detailed description of a preferred embodiment of the invention with reference to the drawings, in which.

DETAILED DESCRIPTION

Figure 1:
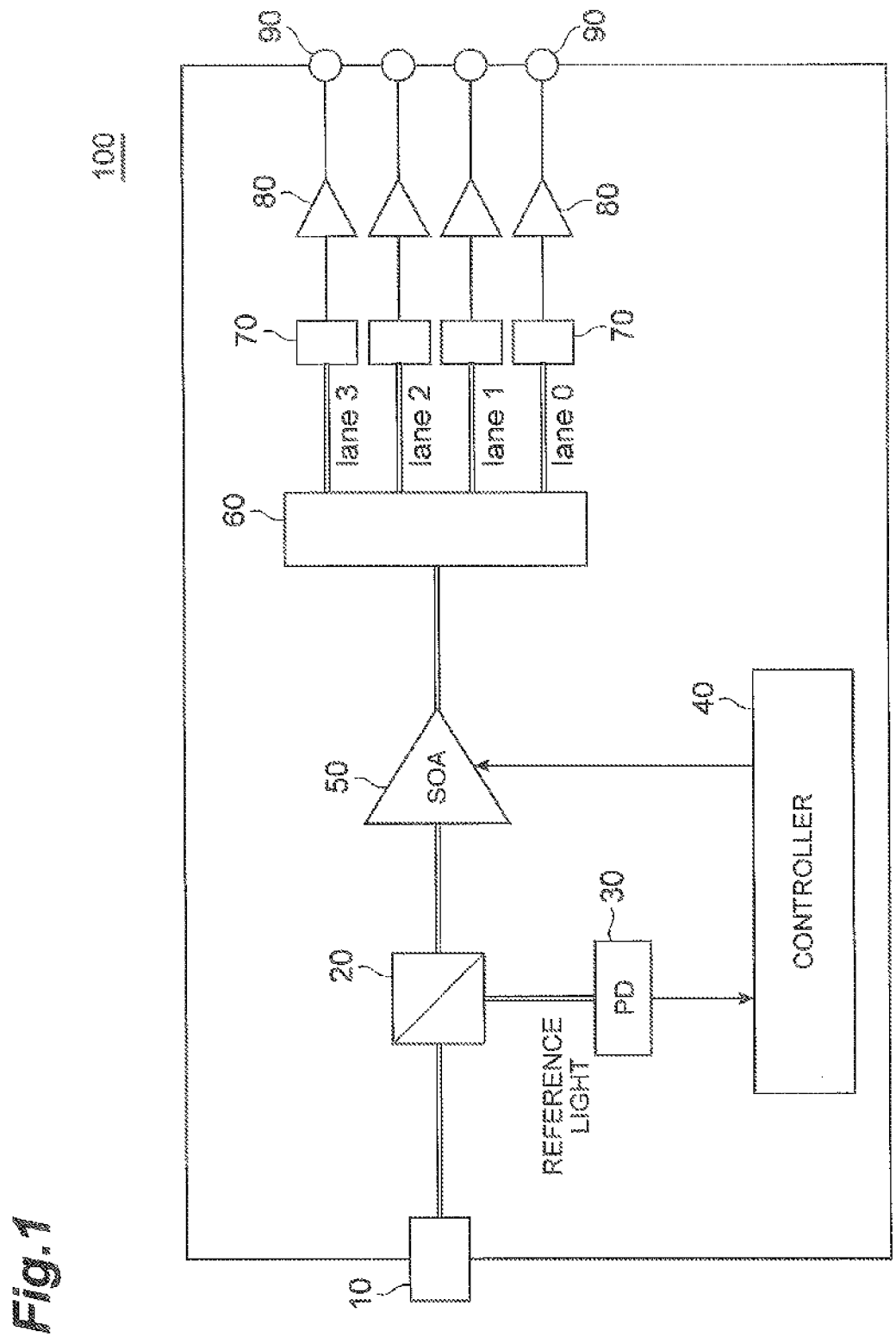
FIG. 1 is a block diagram illustrating an overall configuration of an optical receiver according to an example 1.

Embodiments of the present invention will be described.

One aspect of the present embodiment relates to (1) an optical receiver including: a semiconductor optical amplifier configured to amplify wavelength multiplexed light; an optical demultiplexer configured to demultiplex the wavelength multiplexed light amplified by the semiconductor optical amplifier into light of a plurality of signals having different wavelengths; a plurality of light-receiving elements configured to receive the signal light obtained by demultiplexing of the optical demultiplexer; a detector configured to detect an intensity of the wavelength multiplexed light of a previous stage of the optical demultiplexer; a memory configured to store an upper limit value of a drive current of the semiconductor optical amplifier corresponding to a detection result of the detector; and a controlling the drive current of the semiconductor optical amplifier by referring an output of the detector and the upper limit value.

(2) The upper limit value may define the drive current when an output of either one of the light receiving elements exceeds predetermined value.

(3) The controller may further set a lower limit value in a drive current to be input to the semiconductor optical amplifier.

(4) Another aspect of the present embodiment relates to an optical reception module including: a semiconductor optical amplifier configured to amplify wavelength multiplexed light; an optical demultiplexer configured to demultiplex the wavelength multiplexed light amplified by the semiconductor optical amplifier into light of a plurality signals having different wavelengths; a light-receiving element configured to receive the light of each of the signals obtained, from the optical demultiplexer; and a detector configured to detect an intensity of the wavelength multiplexed light of a previous stage of the optical demultiplexer.

(5) Another aspect of the present embodiment relates to a method for controlling an optical receiver. The method comprising: detecting an intensity of a wavelength multiplexed light; acquiring an upper limit value of a drive current of a semiconductor optical amplifier that amplifies the wavelength multiplexed light; controlling the drive current of the semiconductor optical amplifier by referring the intensity of the wavelength multiplexed light and the upper limit value, the upper limit value defined as a drive current of the semiconductor optical amplifier when an output of either one of light receiving elements that receives an multiplexed light from the wavelength multiplexed light that amplified by the semiconductor optical amplifier exceeds predetermined value.

(6) The control method of an optical receiver may set a lower limit value in the drive current to be input to the semiconductor optical amplifier.

(7) The intensity of the wavelength multiplexed light input the semiconductor optical amplifier may be detected by the detector.

DETAILS OF EMBODIMENT OF PRESENT INVENTION

A specific example of a wavelength-variable laser according to an embodiment of the present invention will be described below with reference to the drawings. In addition, the present invention is not limited, to such exemplary descriptions. It is intended to include, as disclosed in the claims, any meaning equivalent to the claims and all modifications falling within the claims.

Example 1

FIG. 1 is a block diagram illustrating an overall configuration of an optical receiver 100 according to the example 1. The optical receiver 100 is a device for obtaining signal light of each wavelength from wavelength multiplexed light. As illustrated in FIG. 1, the optical receiver 100 includes an input port 10, a beam splitter 20, a light-receiving element 30, a controller 40, a semiconductor optical amplifier 50, an optical demultiplexer 60, a plurality of light-receiving elements 70, a plurality of output circuits 80, a plurality of output ports 90, and the like in a housing.

The input port 10 is connected to an external optical fiber or the like. External wavelength multiplexed light is incident on the input port 10. The beam splitter 20 branches the wavelength multiplexed light incident on the input port 10. The beam splitter 20 causes light branched in one direction as reference light to be incident on the light-receiving element 30 and causes light branched in the other direction to be incident on the semiconductor optical amplifier 50. The light-receiving element 30 is a semiconductor light-receiving element. The light-receiving element 30 outputs a current according to a light intensity of reference light by photoelectrically converting incident reference light. In this embodiment, the beam splitter 20 and the light-receiving element 30 function as a detector for detecting the intensity of the wavelength multiplexed light in a previous stage of the optical demultiplexer.

The controller 40 includes a central processing unit (CPU), a random access memory (RAM), a read only memory (ROM), and the like. The controller 40 controls a drive current to be input to the semiconductor optical amplifier 50 so that the light intensity of wavelength multiplexed light incident on the semiconductor optical amplifier 50 becomes a predetermined value according to a branching ratio of the beam splitter 20 and a current output by the light-receiving element 30. Thereby, the gain of the semiconductor optical amplifier 50 is controlled.

The semiconductor optical amplifier 50 amplifies the incident wavelength multiplexed light according to the drive current input from the controller 40. The optical demultiplexer 60 demultiplexes the wavelength multiplexed light amplified by the semiconductor optical amplifier 50 into light of a plurality of signals having different wavelengths. In this embodiment, the optical demultiplexer 60 demultiplexes the incident wavelength multiplexed light into signal light of four wavelengths. The signal light is incident on the different light-receiving elements 70 via lanes 0 to 3. The light-receiving element 70 is provided in each lane. Four light-receiving elements 70 are provided in this example.

Each light-receiving element 70 is a semiconductor light-receiving element. The light-receiving element 70 outputs a current according to a light intensity of the signal light to each different output circuit 80 by photoelectrically converting the incident signal light. The output circuits 80 and the output ports 90 are provided to be equal in number to the light-receiving elements 70. The output circuit 80, for example, is a transimpedance amplifier (TIA). The output circuits 80 convert input currents into voltage signals and externally output the voltage signals via the different output circuits 80.

According to this example, the light-receiving element 30 for detecting, the light intensity of the wavelength multiplexed light is provided in the previous stage of the semiconductor optical amplifier 50, and the semiconductor optical amplifier 50 is provided in the previous stage of the optical demultiplexer 60. Therefore, it is possible to appropriately control the intensity of signal light received by each light-receiving element 70. Also, the controller 40 may be provided outside the optical receiver 100 via a port or the like. In this case, the optical receiver 100 can be referred to as an optical reception module.

Figure 2:
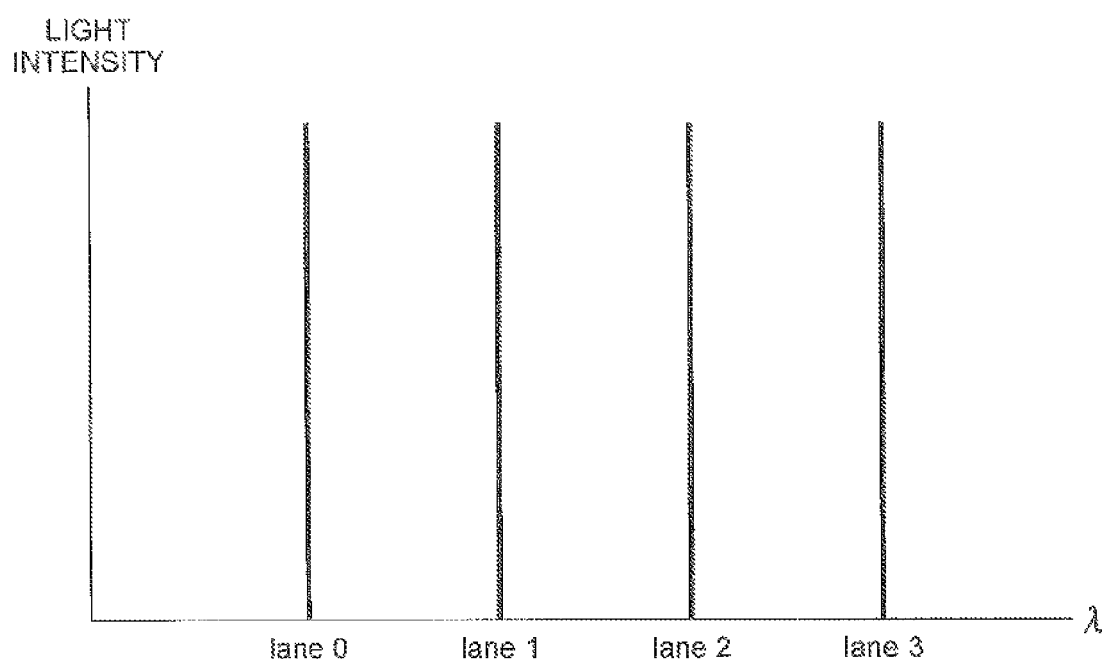
FIG. 2 is a diagram illustrating a light intensity of light each signal included in wavelength multiplexed light.

Next, details of gain control of the semiconductor optical amplifier 50 by the controller 40 will be described. FIG. 2 is a diagram illustrating a light intensity of Eight of each signal included in wavelength multiplexed light. In FIG. 2, lanes 0 to 3 represent light intensities of signal light of the lanes when it is assumed that amplification is not performed in the semiconductor optical amplifier 50. As illustrated in FIG. 2, no deviation in the light intensity is shown in signal light included in the wavelength multiplexed light. However, in the gain of the semiconductor optical amplifier 50, a deviation occurs according to a wavelength. This is because the spectrum of amplified spontaneous emission (ASE) of the semiconductor optical amplifier, which contributes to amplification of input light, is not uniform.

Figure 3A:
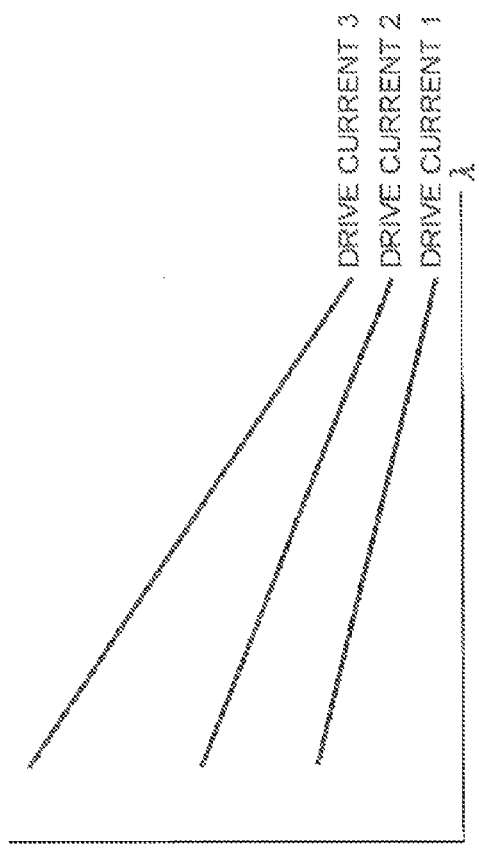
FIG. 3A is a diagram illustrating a relationship of a wavelength of light of each signal, a drive current to be input to a semiconductor optical amplifier, and gain when light of each signal is amplified.

FIG. 3A is a diagram illustrating a relationship of a wavelength of light of each signal, a drive current to be input to the semiconductor optical amplifier 50, and gain when light of each signal is amplified. As illustrated in FIG. 3A, the gain varies according to each wavelength for the same drive current. That is, when the semiconductor optical amplifier 50 is used, it is difficult to amplify signal light having different wavelengths at the same gain.

Figure 3B:
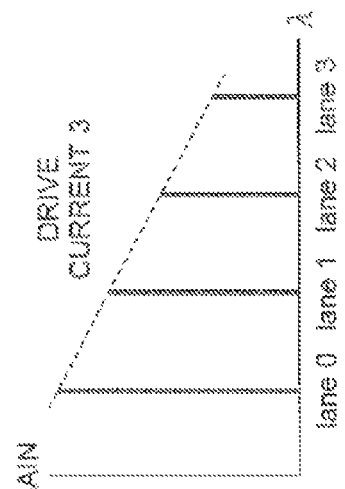
FIG. 3B, FIG. 3C and FIG. 3D are diagrams illustrating a difference in gain due to a difference in a drive current of the semiconductor optical amplifier.
Figure 3C:
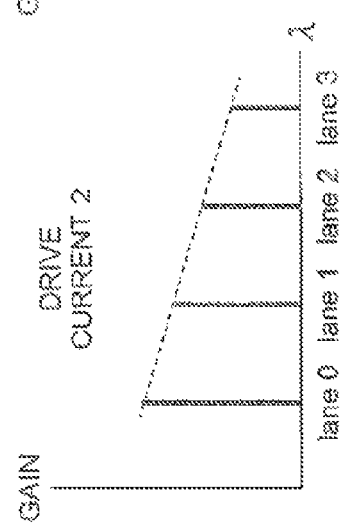
Figure 3D:
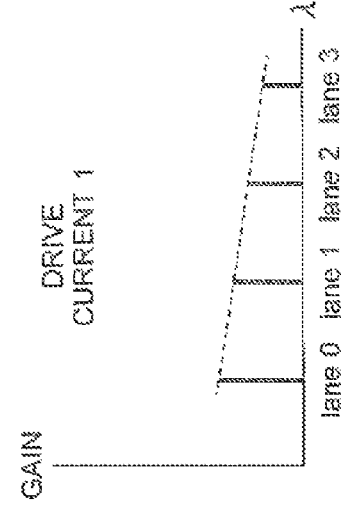

FIG. 3B, FIG. 3C and FIG. 3D are diagrams illustrating a difference in gain due to a difference in a drive current of the semiconductor optical amplifier 50. FIG. 3B, FIG. 3C and FIG. 3D illustrate gains of signal light for drive currents 1 to 3 (drive current 1<drive current 2<drive current 3). As illustrated in FIG. 3B, FIG. 3C and FIG. 3D, a deviation appears in the gain of the signal light. This deviation increases as the drive current increases.

Figure 4:
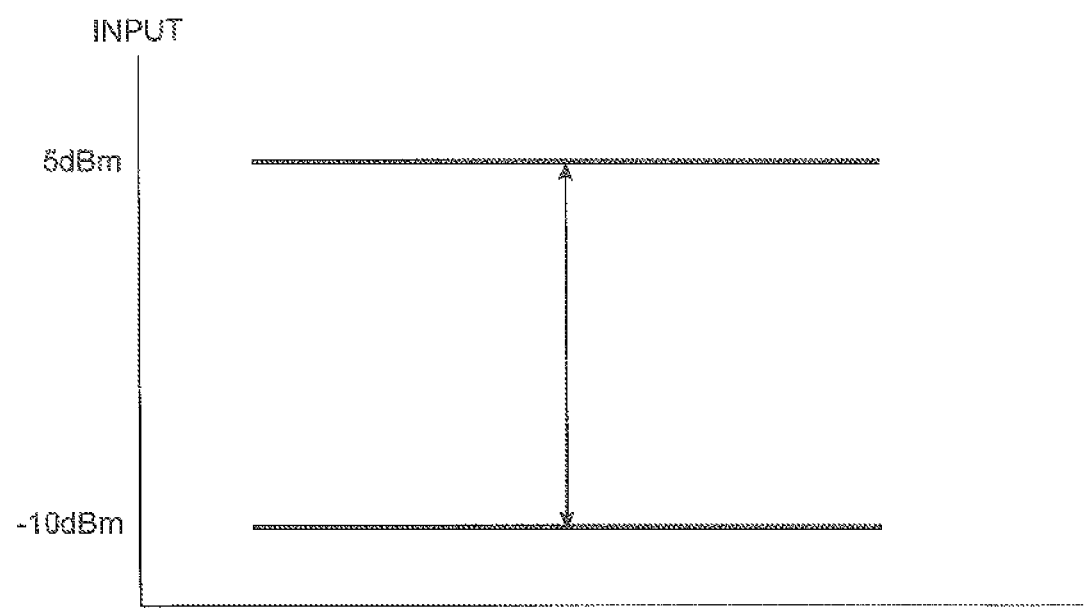
FIG. 4 is a diagram illustrating a dynamic range of a light-receiving element.

According to an output of the light-receiving element 30, any signal light may be excessively amplified if the drive current of the semiconductor optical amplifier 50 is controlled so that a predetermined light intensity defined in advance is output from the semiconductor optical amplifier 50. Here, a dynamic range of the light-receiving element 70 will be described. FIG. 4 is a diagram illustrating the dynamic range of the light-receiving element 70. As one example, the dynamic range of the light-receiving element 70 is −10 dBm to 5 dBm. If signal light exceeding the dynamic range is input to the light-receiving element 70, an error rate of the signal light increases. Also, even when the light intensity of the signal light does not exceed the dynamic range of the light-receiving element 70, an error rate increases if the light intensity of the signal light exceeds the dynamic range of the output circuit 80 or the dynamic range of the external input circuit connected to the output port 90. Therefore, it is preferable to set an upper limit value in the light intensity of the signal light.

Figure 5:
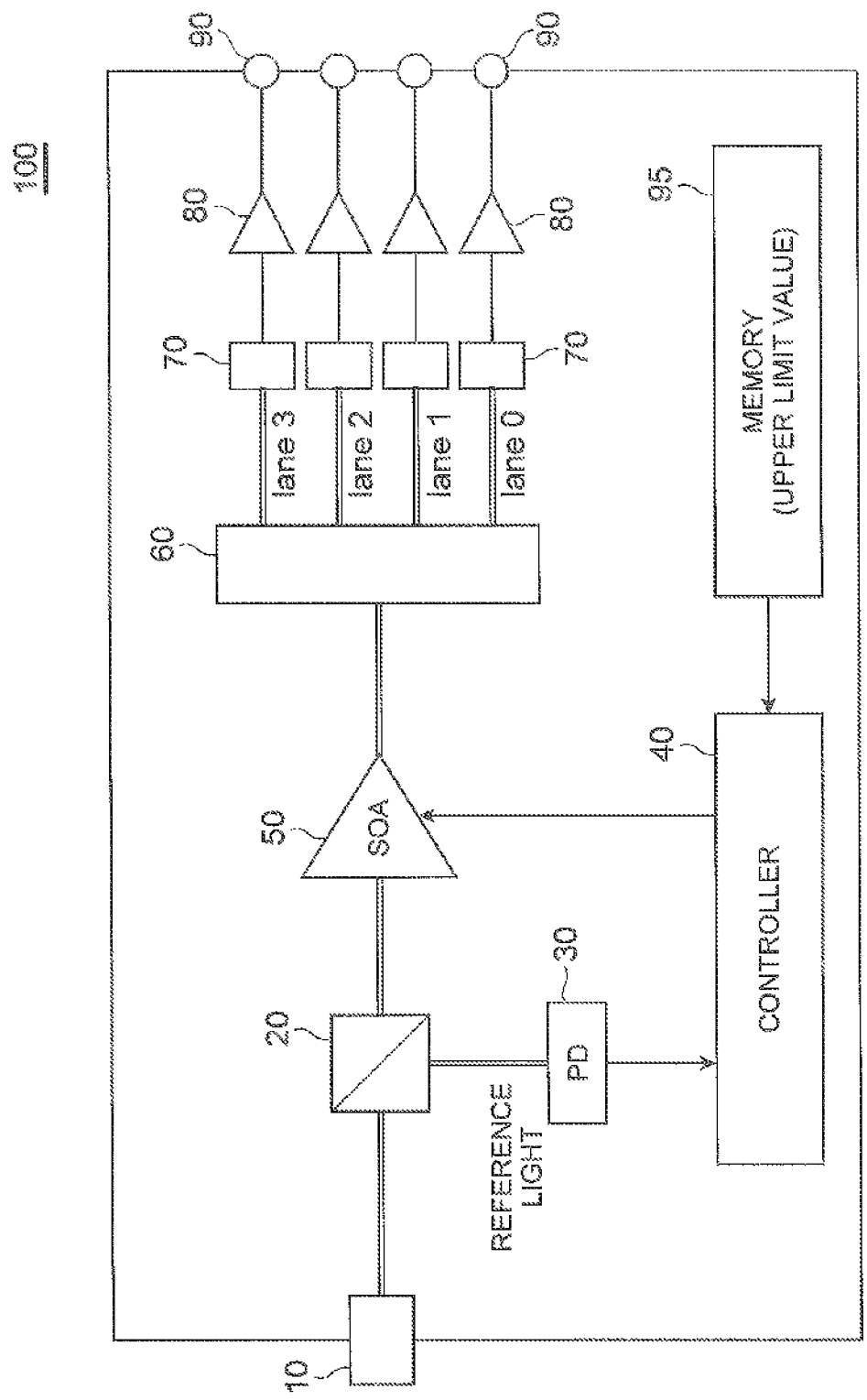
FIG. 5 is a block diagram illustrating an overall configuration including a memory.

Then, the controller 40 sets the upper limit value in the drive current which is input to the semiconductor optical amplifier 50. Specifically, as illustrated in FIG. 5, the controller 40 stores the above-described upper limit value in the memory 95. Then, the controller 40 prevents the drive current of the semiconductor optical amplifier 50 from exceeding the above-described upper limit value by referring to the upper limit value. Thereby, it is possible to prevent the signal light intensity incident on at least any one light-receiving element 70 from increasing excessively.

Figure 6:
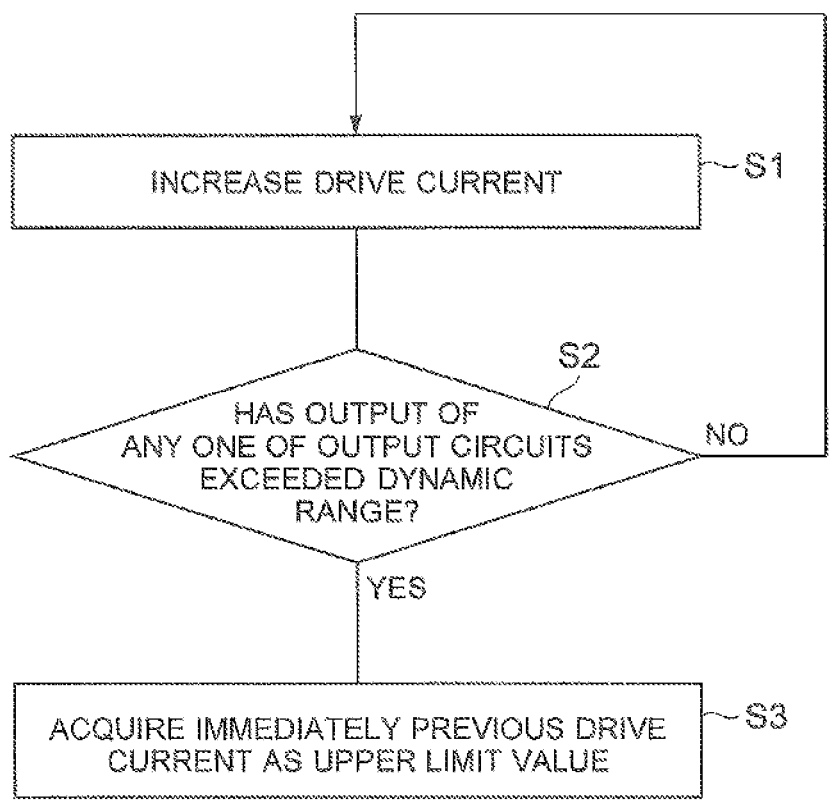
FIG. 6 is an example of a determination flow of an upper limit value.

The above-described upper limit may be set in a range which does not exceed the dynamic range of the light-receiving element 70. In addition, the above-described upper limit value may be set in a range which does not exceed the dynamic range of the output circuit 80 or the dynamic range of the external input circuit connected to the output port 90. FIG. 6 is an example of a determination flow of the above-described upper limit value. As illustrated in FIG. 6, the controller 40 increases the drive current of the semiconductor optical amplifier 50 (step S1). Next, the controller 40 determines whether an output in any one of the output circuits 80 has exceeded a dynamic range (step S2). When "No" has been determined in step S2, step S1 is executed. When "Yes" has been determined in step S2, the controller 40 stores an immediately previous drive current as an upper limit value in the memory 95 (step S3). A determination flow of the upper limit value is executed a plurality of times by changing an input light intensity. Thereby, the upper limit value of the drive current for every input light intensity can be acquired. It is possible to set an upper limit value with higher precision when a change interval of the input light intensity decreases more. In addition, a memory capacity in which the upper limit value is stored can decrease as the change interval of the input light intensity increases. At the time of actual execution, it is only necessary to determine the optimum change interval of an input light intensity based on the precision and the memory capacity. Also, in step S2, it may be determined whether the error rate of each lane has exceeded the upper limit.

Figure 7:
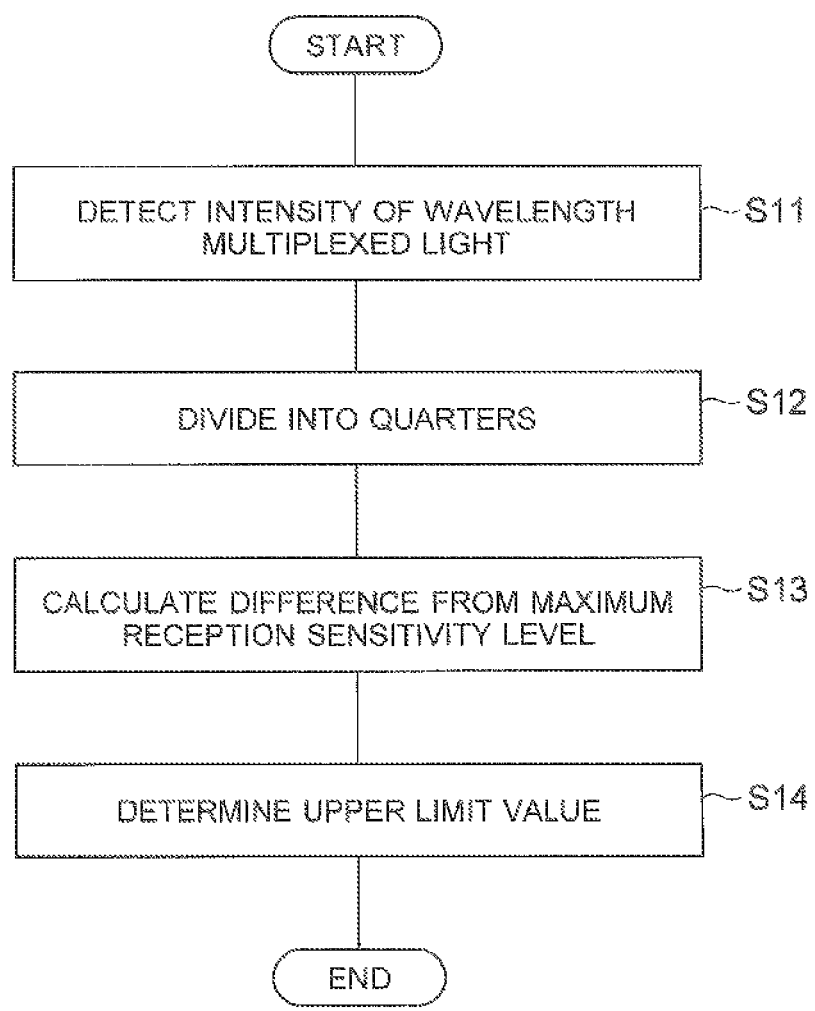
FIG. 7 is an example of a flowchart.

Alternatively, the controller 40 stores a relationship of a wavelength of light of each signal, a drive current to be input to the semiconductor optical amplifier 50, and gain when the light of each of the signals is amplified in the memory 95. Then, the controller 40 may calculate the upper limit value based on the relationship. FIG. 7 is an example of a flowchart in this case. As illustrated in FIG. 7, the controller 40 detects the intensity of the wavelength multiplexed light incident on the semiconductor optical amplifier 50 according to an output current of the light-receiving element 30 (step S11).

Next, the controller 40 divides the intensity detected in step S11 into quarters (step S12). In dB, the division into quarters corresponds to a decrease of 6 dB. Next, the controller 40 calculates a difference between the intensity obtained in step S12 and a maximum reception sensitivity level (overload output) which is an upper limit of the dynamic range of the light-receiving element 70 (step S13). Next, the controller 40 determines the upper limit value of the drive current of the semiconductor optical amplifier 50 based on the relationship of the wavelength of light of each signal, the drive current to be input to the semiconductor optical amplifier 50, and the gain when the light of each of the signals is amplified so that the difference calculated in step S13 is not less than or equal to zero (step S14). The upper limit value obtained in step S14 is stored in the memory 95. Thereafter, the controller 40 uses the upper limit value as an upper limit value of the drive current of the semiconductor optical amplifier 50.

Figure 8:
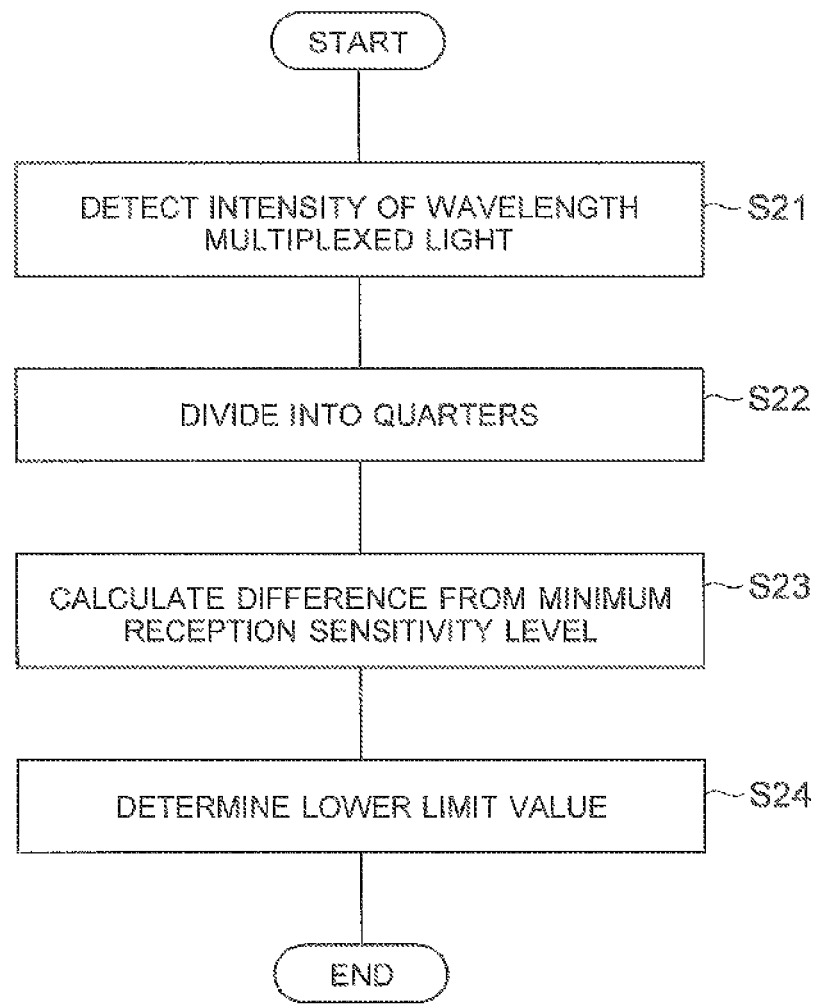
FIG. 8 is an example of a flowchart.

Also, the controller 40 may set a lower limit value in the drive current of the semiconductor optical amplifier 50. FIG. 8 is an example of a flowchart of this case. As illustrated in FIG. 8, the controller 40 detects the intensity of the wavelength multiplexed light incident on the semiconductor optical amplifier 50 according to an output current of the light-receiving element 30 (step S21). Next, the controller 40 divides the intensity detected in step S21 into quarters (step S22). In dB, the division into quarters corresponds to a decrease of 6 dB.

Next, the controller 40 calculates a difference between the intensity obtained in step S22 and the minimum reception sensitivity level which is a lower limit of the dynamic range of the light-receiving element 70 (step S23). Next, the controller 40 determines a lower limit value of the drive current of the semiconductor optical amplifier 50 based on a relationship of a wavelength of light of each signal, a drive current to be input to the semiconductor optical amplifier 50, and gain when the light of each of the signals is amplified so that the difference calculated in step S23 is not less than or equal to zero (step S24). The lower limit value obtained in step S24 is stored in the memory 95. Thereafter, the controller 40 uses the lower limit value as a lower limit value of the drive current of the semiconductor optical amplifier 50.

In this manner, the intensity of the signal light received by each light-receiving element 70 is included in the dynamic range, so that it is possible to prevent the error rate from being degraded. Also, the example of FIG. 3A is one example and a peak may appear in the gain at a predetermined wavelength. In addition, the relationship between the wavelength of the signal light and the gain may vary according to the drive current.

Example 2

Figure 9:
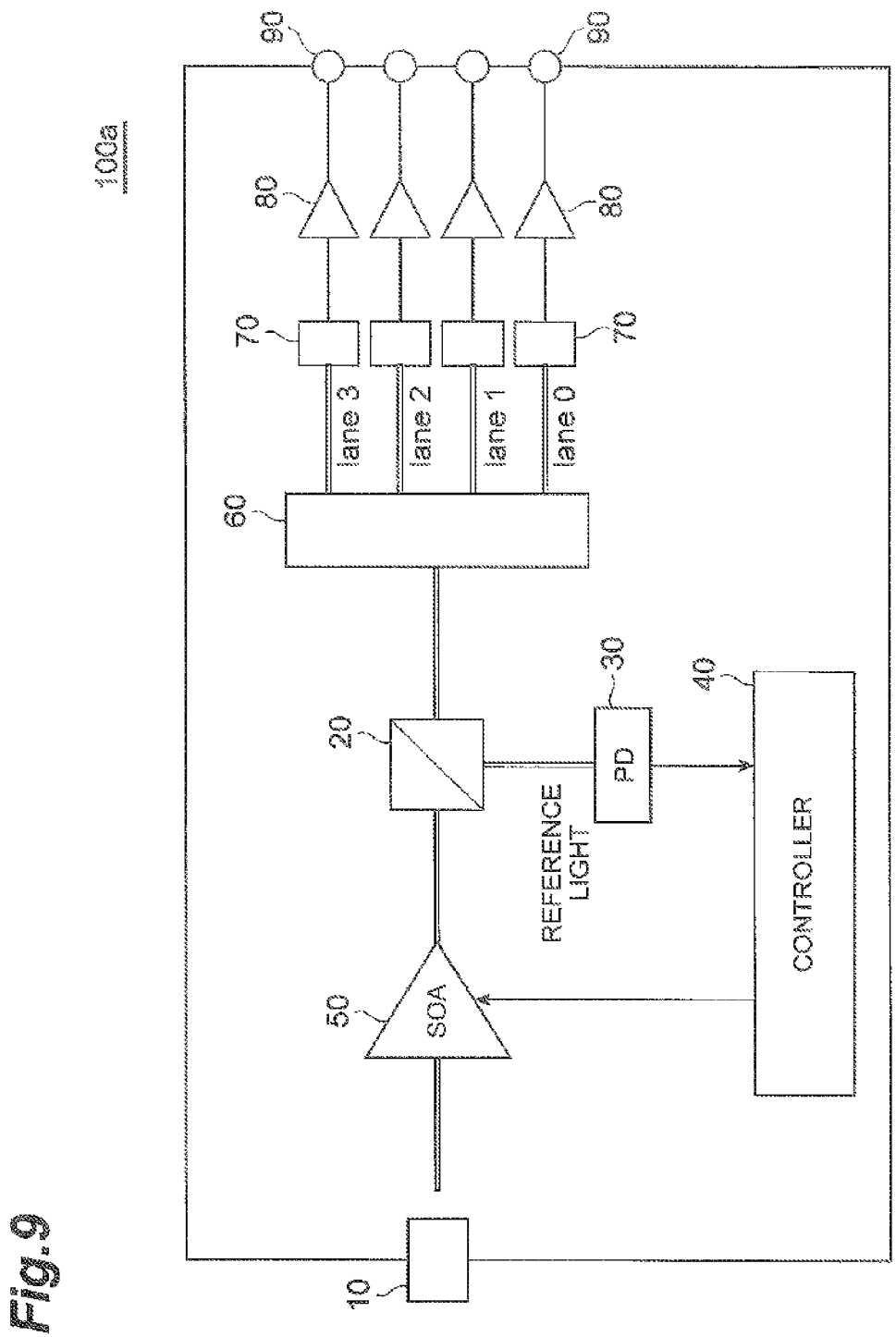
FIG. 9 is a block diagram illustrating an overall configuration of an optical receiver according to an example 2.

Although the intensity of the wavelength multiplexed light incident on the semiconductor optical amplifier 50 is detected using the light-receiving element 30 in the example 1, the present invention is not limited thereto. In the example 2, the intensity of output light of the semiconductor optical amplifier 50 may be detected using the light-receiving element 30. FIG. 9 is a block diagram illustrating an overall configuration of an optical receiver 100a according to the example 2. The optical receiver 100a different from the optical receiver 100 of FIG. 1 in that the output light of the semiconductor optical amplifier 50 is detected using the light-receiving element 30. In this case, it is possible to set the drive current of the semiconductor optical amplifier 50 according to the output of the semiconductor optical amplifier 50.

What is claimed is:
1. An optical receiver comprising:
   a semiconductor optical amplifier configured to amplify wavelength multiplexed light;
   an optical demultiplexer configured to demultiplex the wavelength multiplexed light amplified by the semiconductor optical amplifier into light of a plurality of signals having different wavelengths;

a plurality of light-receiving elements configured to receive the signal light obtained by demultiplexing of the optical demultiplexer;

a detector configured to detect an intensity of the wavelength multiplexed light of a previous stage of the optical demultiplexer;

a memory configured to store an upper limit value of a drive current of the semiconductor optical amplifier corresponding to a detection result of the detector, based on the plurality of light-receiving elements; and a controller controlling the drive current of the semiconductor optical amplifier by referring to an output of the detector and the upper limit value.

2. The optical receiver of claim 1, wherein the upper limit value is defined by the drive current when an output of one or more of the plurality of light-receiving elements exceeds a predetermined value.

3. The optical receiver of claim 1, wherein the controller further sets a lower limit value of the drive current to be input to the semiconductor optical amplifier.

4. A method for controlling an optical receiver, the method comprising:

detecting an intensity of a wavelength multiplexed light;

acquiring an upper limit value of a drive current of a semiconductor optical amplifier that amplifies the wavelength multiplexed light;

controlling the drive current of the semiconductor optical amplifier by referring to the intensity of the wavelength multiplexed light and the upper limit value, the upper limit value defined as a drive current of the semiconductor optical amplifier when an output of one or more of a plurality of light-receiving elements that receives multiplexed light from the wavelength multiplexed light that is amplified by the semiconductor optical amplifier exceeds a predetermined value.

5. The method for controlling the optical receiver of claim 4, further comprising:

setting a lower limit value in the drive current to be input to the semiconductor optical amplifier.

6. The method for controlling the optical receiver claim 4, wherein the intensity of the wavelength multiplexed light input to the semiconductor optical amplifier is detected by a detector.

* * * * *